United States Patent
Lydecker et al.

(10) Patent No.: US 7,333,863 B1
(45) Date of Patent: Feb. 19, 2008

(54) RECORDING AND PLAYBACK CONTROL SYSTEM

(75) Inventors: George Lydecker, Burbank, CA (US); Alan J. McPherson, Burbank, CA (US); Edwin Outwater, III, Santa Monica, CA (US); Gregory Thagard, Encino, CA (US)

(73) Assignee: Warner Music Group, Inc., New York, NY (US)

( * ) Notice: Subject to any disclaimer, the term of this patent is extended or adjusted under 35 U.S.C. 154(b) by 0 days.

(21) Appl. No.: 08/850,996

(22) Filed: May 5, 1997

(51) Int. Cl.
*G06F 17/00* (2006.01)
(52) U.S. Cl. .................... 700/94; 381/119; 381/103
(58) Field of Classification Search .............. 700/94; 704/270, 272, 275, 278, 229, 230; 381/22, 381/80, 119, 103, 61, 107, 104, 11; 369/32.01, 369/69
See application file for complete search history.

(56) References Cited

U.S. PATENT DOCUMENTS

| | | | | |
|---|---|---|---|---|
| 4,704,728 A | * | 11/1987 | Scheiber | 381/22 |
| 4,891,839 A | * | 1/1990 | Scheiber | 381/22 |
| 4,922,536 A | * | 5/1990 | Hoque | 381/80 |
| 5,173,944 A | * | 12/1992 | Begault | 381/17 |
| 5,406,634 A | * | 4/1995 | Anderson et al. | 381/86 |
| 5,583,962 A | * | 12/1996 | Davis et al. | 704/230 |
| 5,590,094 A | | 12/1996 | Inanaga et al. | |
| 5,632,005 A | * | 5/1997 | Davis et al. | 704/230 |
| 5,633,981 A | * | 5/1997 | Davis | 704/230 |
| 5,652,797 A | * | 7/1997 | Okamura et al. | 381/119 |
| 5,682,461 A | * | 10/1997 | Silzle et al. | 395/2.14 |
| 5,909,664 A | * | 6/1999 | Davis et al. | 704/230 |
| 5,937,071 A | * | 8/1999 | Kishii et al. | 381/17 |
| 5,946,400 A | * | 8/1999 | Matsuo | 381/61 |
| 5,974,154 A | * | 10/1999 | Nagata et al. | 381/61 |
| 5,978,492 A | * | 11/1999 | Furuhashi | 381/119 |
| 5,982,902 A | * | 11/1999 | Terano | 381/61 |
| 6,239,348 B1 | * | 5/2001 | Metcalf | 84/723 |

FOREIGN PATENT DOCUMENTS

| | | |
|---|---|---|
| DE | 42 02 609 A | 8/1992 |
| JP | 58063207 | 4/1983 |

OTHER PUBLICATIONS

European Patent Office Search Report for co-pending Application No. 99950227.1; issued Sep. 30, 2004.

\* cited by examiner

*Primary Examiner*—Xu Mei
(74) *Attorney, Agent, or Firm*—Gottlieb, Rackman & Reismann, P.C.

(57) ABSTRACT

The invention is a system for recording and reading both program data and acoustical control data and playing back the data to optimize performance of audio reproduction and recreate the effect of an original acoustic environment. The system has a recording apparatus, a playback apparatus and a recording media. The recording apparatus produces recording media having both acoustic control information and audio data. The playback apparatus gives the user some ability to override otherwise automatic parameter adjustments. Optionally, a metadata display system takes information about the physical arrangement of instruments and other characteristics of the recording session and the recording studio and makes that visually available to the listener. A player type register identifies the characteristics of the playback device to cause an adjustment of the characteristics of the playback system.

14 Claims, 4 Drawing Sheets

RECORDING AND PLAYBACK CONTROL SYSTEM

FIELD OF THE INVENTION

This invention relates to systems for recording and playing back audio information on optical recording media. In particular, it relates to such systems that compensate for the differences between the characteristics of the recording and playback sites.

BACKGROUND OF THE INVENTION

The present invention is concerned with apparatus and methods for playing back recorded material from media, particularly, but not strictly limited to high density optical recording media such as DVD discs containing acoustic data, e.g., music. For purposes of this disclosure, the term "music" is to be understood throughout to include the possibility of video. A serious limitation of the present systems is that they record music in a studio or a concert hall and leave it to the listener/viewer (herein termed the "listener") to adjust the playback apparatus to attempt to reproduce the artist's intended sound in a different playback site, i.e., his home, or car. However, because the recording and playback sites almost always have different acoustic characteristics, it is not feasible for the listener satisfactorily to manage the adjustment of the playback equipment.

SUMMARY OF THE INVENTION

The present invention provides a system for recording and reading audio visual control data (herein termed "acoustic control data"), together with the musical program data, and playing back the program data in accordance with the acoustical control data to optimize performance of audio reproduction and recreate the original acoustic environment. Basically, it provides a system for incorporating the acoustic control data into the information stored on the media and, during playback, provides components responsive to the control data during the playing back of the musical program. The acoustic control data includes several parameters and may be used to adjust the operation of the playback system as accurately and as often as desired, down to millisecond intervals.

The system of the invention comprises a recording apparatus, a playback apparatus and a high density digital recording media, such as DVD. The recording apparatus comprises in addition to the standard equipment, a precision microphone, a controller, a test signal generator and a data multiplexer to produce recording media having both the acoustic control information and the audio data.

The playback system comprises a demultiplexer, a customer input interface giving the user some ability to override the otherwise automatic parameter adjustments, optionally a metadata display system that takes information about the physical arrangement of instruments in the recording studio and makes that information visually available to the listener, and a register that identifies the characteristics of the playback apparatus. The playback apparatus further includes data processing components for processing the acoustic program data, these components being dynamically controlled using the acoustic control data.

An open and closed loop control scheme is also provided. In the open loop scheme, the acoustic characteristics of local playback site are provided to the playback apparatus by the listener at the playback apparatus.

In the closed loop control scheme, the acoustic parameters of the playback site are automatically determined, by generating acoustical test signals and sensing the responses. In either case, the characteristics of the recording and playback sites are compared and used to control the operation of the playback components.

The playback apparatus may also include a noise cancellation circuit which receives special information of the acoustic program data from the recording site.

DETAILED DESCRIPTION OF PREFERRED EMBODIMENTS

The invention shall now be described for a particular preferred embodiment in conjunction with the drawings. This preferred embodiment of the present system concerns the generation and replaying of audio data recorded on a pure audio DVD (digital versatile disk). The DVD is an optical recording disc medium having very high data density and MPEG compression of the audio data. The system consists, in addition to the DVD, of a recording apparatus, which herein shall refer to collectively all the equipment involved in generating a DVD media having data representative of a live performance of music or other similar performing activity, and a playback apparatus in which the data from the DVD is reproduced for the listening pleasure of a customer.

Figure 1:
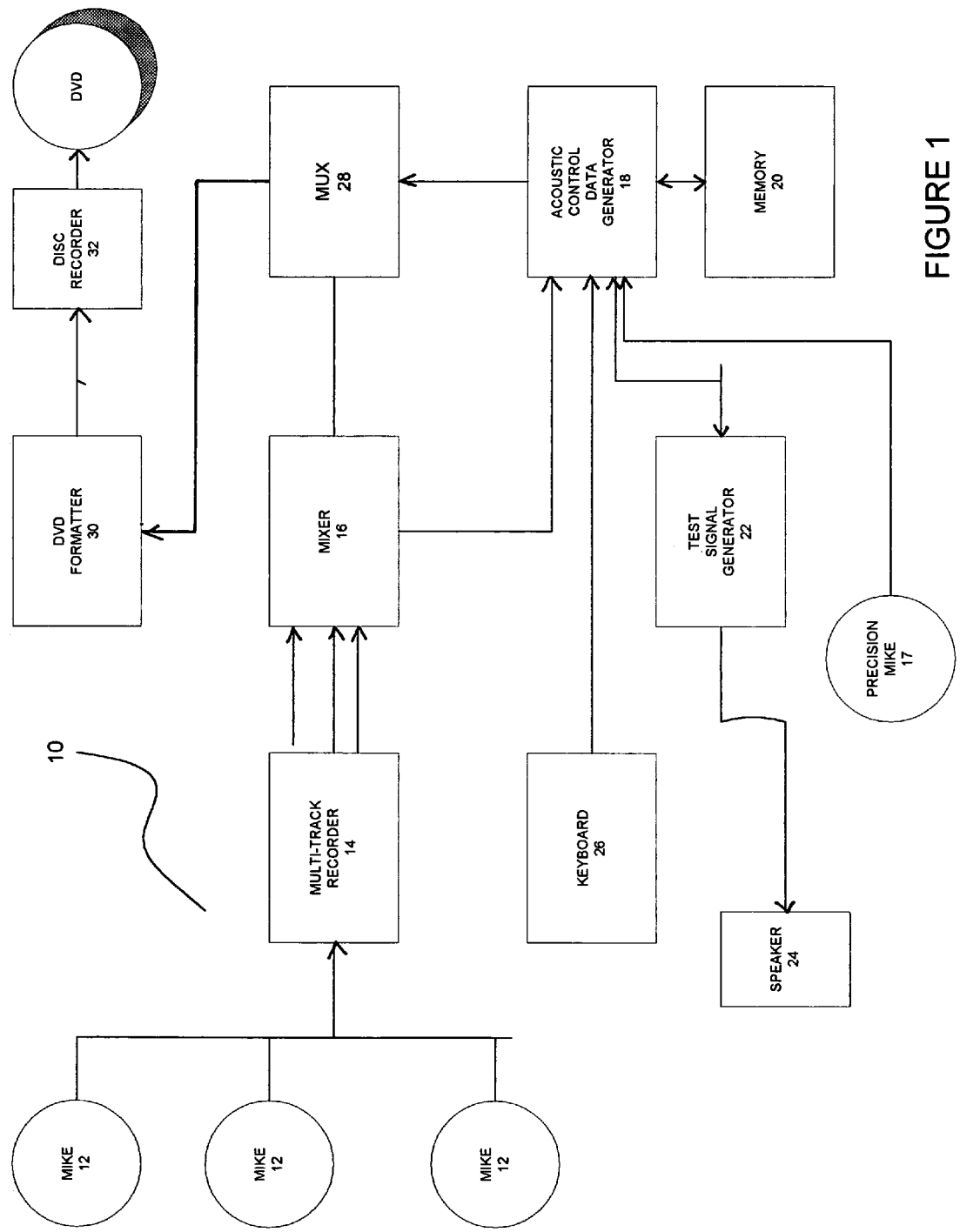
FIG. 1 shows a block diagram for the recording apparatus.

Referring to FIG. 1, the recording apparatus 10 is disposed at a recording site or venue. It includes a plurality of primary microphones 12 used for picking up sounds generated during the performing activity. The signals generated by these microphones 12 are fed to a multichannel recorder 14. The signals may be stored in the recorder 14, for later processing or may be fed immediately to a mixer 16. The mixer 16 combines these signals into a multi-channel and stereo stream of audio data, which for the sake of simplicity, shall be referred to as the program data.

An important feature of the present invention is that prior to the performance being recorded, a data generator 18 determines the acoustic conditions of the recording venue and/or control room for the performance and stores the same in a memory 20. In order to determine these conditions, the generator 18 activates a test signal generator 22 which in response generates a predetermined test signal to an auxiliary speaker 24. A precision microphone 17 senses the response at the recording locale to the test signal and sends the same to generator 18 and stores it in memory 20. The recording locale (or venue) is the actual zone where the performance takes place. In addition, the data generator 18 also receives mixing information from the mixer 16 and stores the same in memory 20 as well. Additionally, the producer of the performance may enter specific data regarding the reproduction of the performance to memory 20 via a keyboard 26. All of this information shall be referred to collectively as acoustical control data.

The acoustical control data stored in memory 20 is interleaved with the audio information on the DVD as described more fully below and is used during the playing of the DVD, either to recreate the conditions under which the recording was made and/or other conditions selected by the producer. More particularly, the memory 20 contains information descriptive of the acoustic characteristic of the room where the recording occurs. Of course these characteristics are dependent on the size of the room, the composition of the wall coverings, the height, etc, all of which affect how the sounds are recorded. These characteristics in turn affect certain acoustical properties such as delay, reverberation, and so on, and are determined by data generator 18 from the response to the test signal from generator 22.

In addition, the manner in which the sounds from the different microphones 12 are mixed, i.e. the various proportions or ratios are important when the performance is replayed, especially in a multichannel system since, for most accurate reproduction, the sounds should be replayed by speakers in proportions corresponding to these mixing ratios as described below. Accordingly, this information is also recorded in memory 20.

Finally, the producer may desire to change some of these characteristics. This is especially desirable if when multichannel signals are folded down to generate two-channel stereo sounds. The producer has the ability to define the fold down characteristics using keyboard 26.

The producer may optionally also provide to the data generator various other parameters. Alternatively, this information may be provided automatically from the mixer 16, the recording equipment or another microphone. Some of these parameters are:
- instrumental placement;
- instrument separation partition placement;
- peak or RMS limiting in the mixer 16;
- equalization, compression and other similar recording information;
- studio and/or control room dynamic data such as reverb time, delay time, standing waves, ambient noise;
- room frequency response, room dynamic information; etc.

The acoustical visual control data, or AVCD, is fed to multiplexer 28 which combines the program data with this AVCD and feeds the same to a formatter 30. Formatter 30 partitions the combined data and, if necessary, adds additional data including for example parity codes, error correction codes, etc., in conformance with a particular DVD standard used. The resulting data is recorded on a DVD by a recording device 32.

Figure 2:
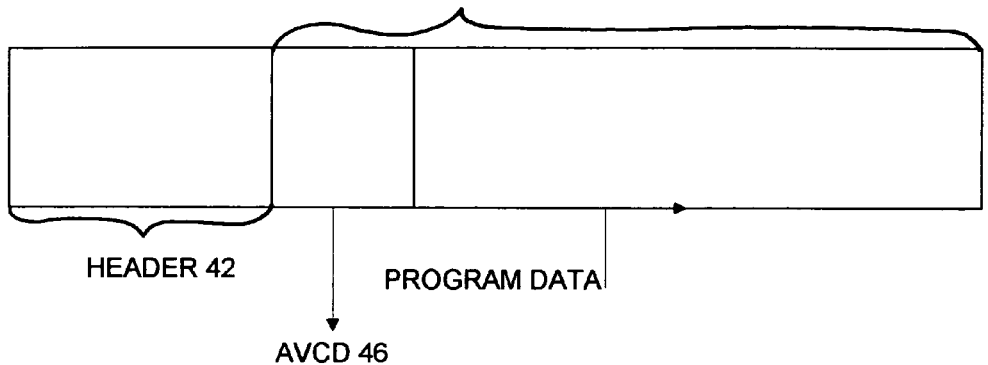
FIG. 2 shows a typical sector on a recording media in accordance with the invention.

A typical data sector 40 shown in FIG. 2 and consists of a header portion 42 and a data portion 44. In a typical DVD scheme, the data portion 44, which normally is reserved to the actual program data is 2048 bytes and the header portion 42, which carries other types of signals and contains 156 bytes. In the present invention, a small section 46 is carved out, preferably of the data portion 44, as shown, and dedicated for the AVCD signals. In FIG. 2, section 46 is shown at the beginning of the data portion 44, however it may be disposed at other locations as well.

While in FIG. 2, AVCD is shown as being provided in a sector 40, it should be understood that this data need not be repeated in every sector. Instead, the AVCD may be provided in every sector on the DVD or, in an ultimate case, once for each DVD.

Figure 3:
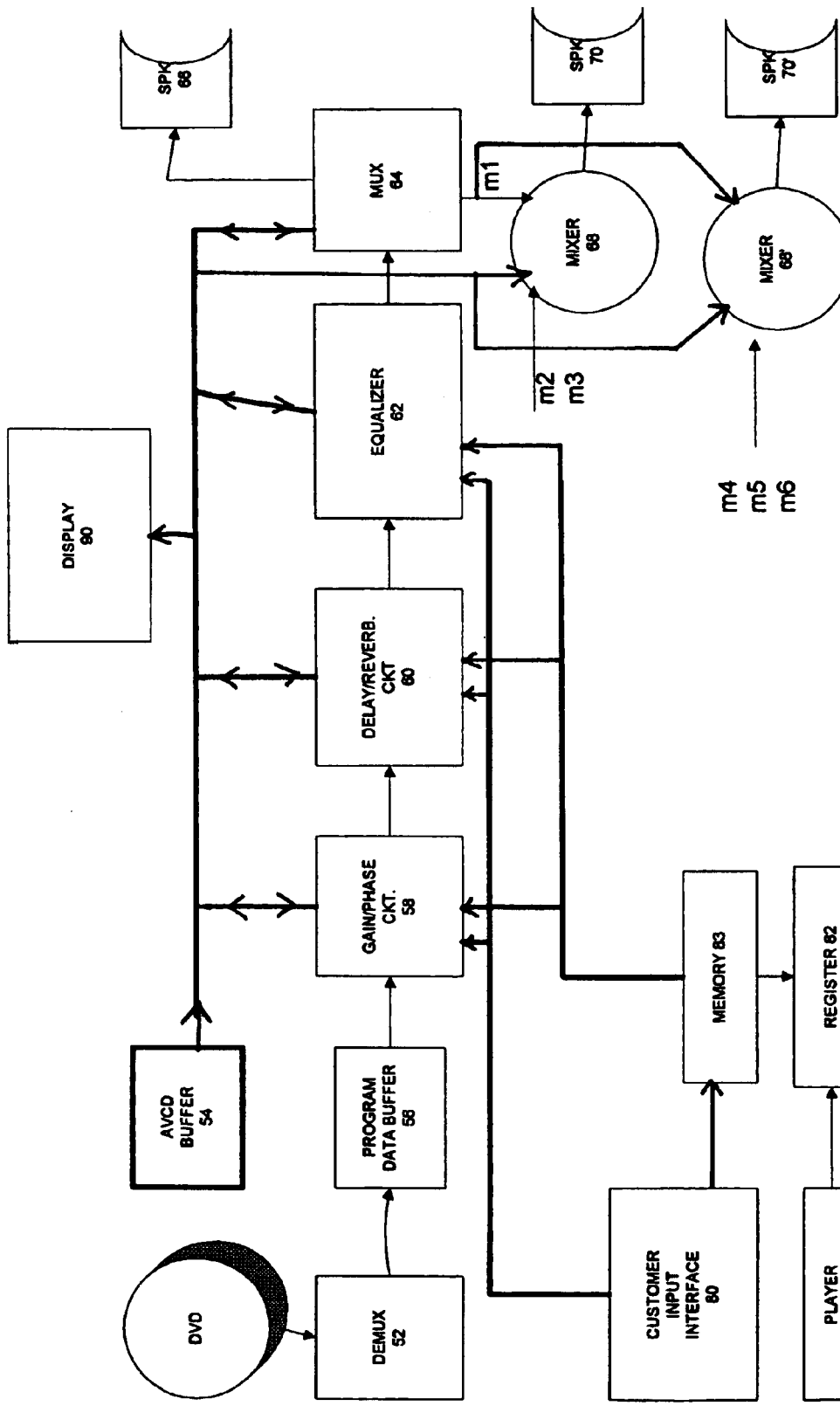
FIG. 3 shows a block diagram of the playback apparatus.

The other portion of the subject system is the playback apparatus. As shown in FIG. 3, this playback apparatus 50 includes a demultiplexer 52, an AVCD buffer 54 for the AVCD signal and a buffer 56 for the program data. The demultiplexer 52 separates the AVCD and the program data for the respective buffers 54, 56 from the incoming data as it is read off the DVD. It also reads the header information and performs other control functions, such as error correction, which do not form a part of this invention. A DVD player which shows details of such a demultiplexer is disclosed in U.S. Pat. No. 5,463,565, incorporated herein by reference.

Preferably player 50 is a multichannel audio DVD player capable of generating six channels. (Such players are commonly referred to as generating 5.1 channels, the last channel being dedicated to a low frequency subwoofer.) The program data from buffer 56 is fed via six lines L1-L6, to six processing channels. Typical processing circuits are shown in FIG. 3 for one channel, it being understood that the elements for the other channels are substantially identical.

The program on L1 is fed first to a gain/phase circuit 58 for amplification, gain adjustment and phase correction in accordance with certain control signals as described below.

The adjusted signals are sent to a delay/reverberation circuit 60 where the delay of the signals for appropriate reverberation are adjusted. The signals are next sent to an equalizer 62. After equalization, the signals are sent to a multiplexer 64.

The operation of the multiplexer 64 is dependent on the number and arrangement of speakers that the costumer wants to use. For a full 5.1 channel surround sound, the multiplexer sends the signals to an appropriate speaker 66, it being understood that similar speakers are provided for each of the other channels.

To achieve two channel 'stereo sound', the multiplexer 64 first sends the sounds for channel 1 to a mixer 68 on line m1. This mixer 68 also receives signals on lines m2, m3 for signals from other channels. The signals from these channels are mixed at certain ratios described more fully below, to generate a 'left' signal for a speaker 70. Similarly signals from lines m3, m4, m5 generated by other channels (not shown) are fed to a second mixer 68' where they are combined to generate a so-called 'right' signal for a speaker 70'. Thus, in effect, the two mixers 68, 68' fold the signals from six channels into a standard two-channel stereo signals.

In addition, the playback apparatus 50 further includes a customer input interface 80 and a register 82. The customer input interface 80 is used by the customer to input his preferences, and, if so desired, to override the AVCD as described more fully below. The register 82 is used by the manufacturer to store certain device specific information, such as whether the player is an automobile player, a home player, a personal or portable player, a studio player, and so on.

The acoustic characteristics of the playback site play an important role in the accuracy of the reproduction. These characteristics include the physical dimensions of the room where the playback apparatus is to be used, including characteristics of the walls, the location of the speakers, etc. For best reproduction quality, the playback apparatus 50 should have information descriptive of all these characteristics.

Two configurations are envisioned for providing these local characteristics to the playback apparatus 50. In one configuration, an open loop control is used. In this configuration, the customer provides the descriptive information to the playback apparatus 50. For example, in response to prompts, the customer may enter the size of the room, the location of the speakers, etc. This information is then stored in memory 83. In addition, related acoustic parameters, are also determined and stored in memory 83.

Figure 4:
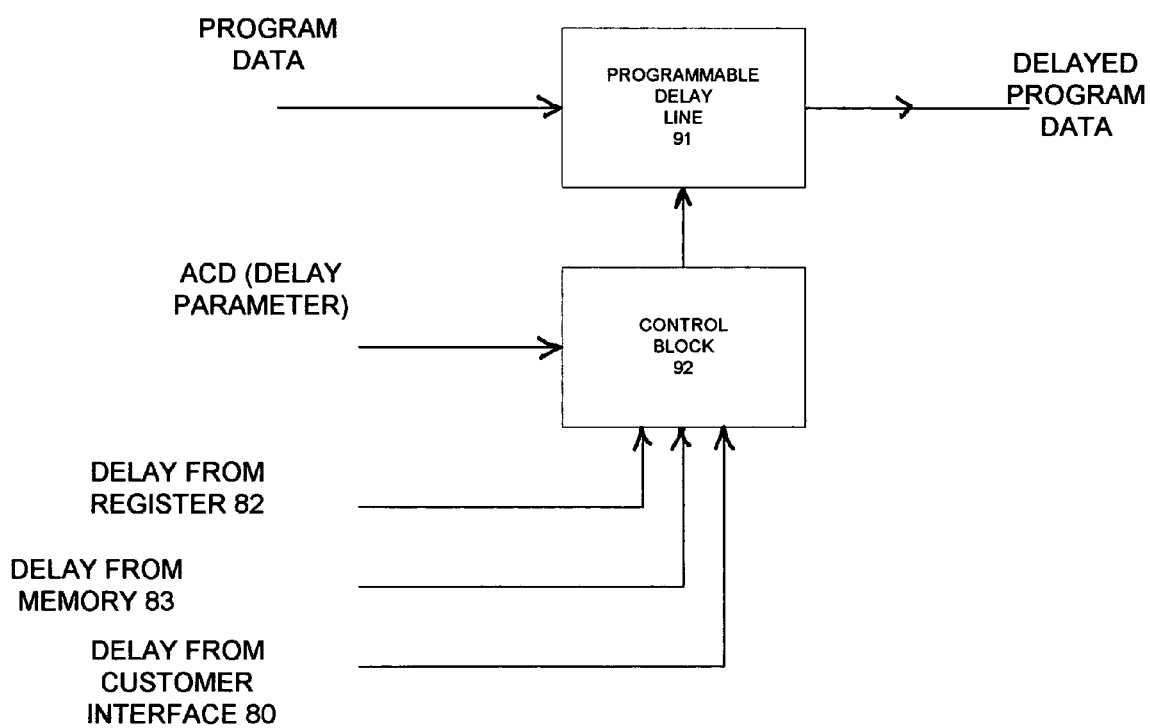
FIG. 4 shows details of the delay circuit.

The information from memory 83 and register 82 is used by each of the elements 58, 60, 62, 64 in conjunction with the ACD information from buffer 54 to perform their respective functions. This feature of the invention is best explained in conjunction with a specific element. FIG. 4 shows details of the delay circuit 60. The delay circuit 60 includes a programmable delay line 91 and a control block 92. The control block receives a reference delay parameter which is one of the parameters of the AVCD and is determined at the recording site 10. The control block also receives an input from register 82, or memory 83.

Control block 92 may be for example a look-up table which uses the information received to generate an appropriate delay for the signals of channel 1, by comparing for example the delay characteristic of the room with the optimal delay indicated by the reference delay parameter. This delay control signal is then fed to programmable delay line 91. For example, the original performance may have been recorded in a concert hall having a delay time of 2 seconds. On the other hand the customer may be keeping his player in relatively small room with a delay of 0.5 seconds. Therefore for optimum playing a delay of 1.5 sec is required. This delay is developed by delay line 91 as defined by the control block 92.

Of course, the customer may desire to have the sounds played with different characteristics. He may chose these characteristics using the customer interface 80. When the customer makes his choice, rather then having the system generate the delay automatically, the customer choice is fed to the controller block 92 from memory 80 and is used to override any previous decisions.

Thus the operation of each of the elements 58, 60, 62, 64 is adjusted using information from the AVCD, the register 82, memory 83 and the customer input interface 80.

Of particular importance are the mixing ratios used by mixer 68. As discussed above, these ratios can be set using information from the ACD which is derived from information on how the mixer 16 is set, and, optionally, the ratios set by the producer using keyboard 26.

Figure 5:
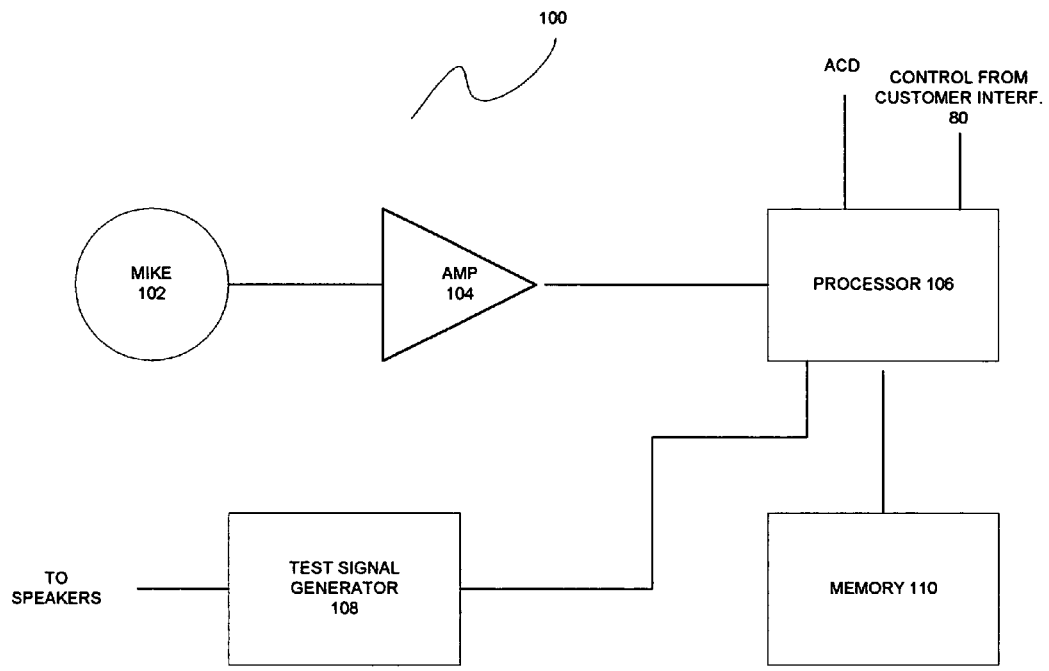
FIG. 5 shows a block diagram for the closed loop control configuration.

In the second configuration of the invention a closed loop control system is used. In this configuration, a control circuit 100 is provided which includes (FIG. 5) a microphone 102, an amplifier 104, a processor 106, and test generator 108. The test generator is used to generate on command a test signal. For example, the test generator may be used to generate pink noise, or a particular test sound defined by the AVCD. This test signal is transmitted to the speakers of the player 50. The test may be identical to the test signal from generator 22.

Preferably the microphone 102 is located, at least temporarily, at a central location within the room wherever the customer prefers to listen to the player. The microphone 102 is connected via the amplifier 104 to the processor 106 either by direct wiring or by an indirect coupling such as RF, IR, or other similar means.

In any event, the processor 106 routes the test signals from generator 108 to each of the speakers 66 serially and/or simultaneously to allow the processor to analyze the acoustic characteristics of the customer's listening room, including its size, wall covering, speaker locations, and so on. Thus, instead of having the customer enter information and calculating these characteristics, the characteristics are obtained directly. These characteristics may have to be adjusted to compensate for changes in the room.

After the characteristics are obtained as described, they are stored in a memory 110. The information from this memory is then used in the same manner as the information from memory 83. Register 82 is still used to store player specific information.

The AVCD may be used for other important information as well. For instance, many high quality-players, especially players designed to be used in automobiles, may include a noise cancellation circuit for canceling road noise. Noise cancellation may be advantageously incorporated into the present system as follows.

Figure 6:
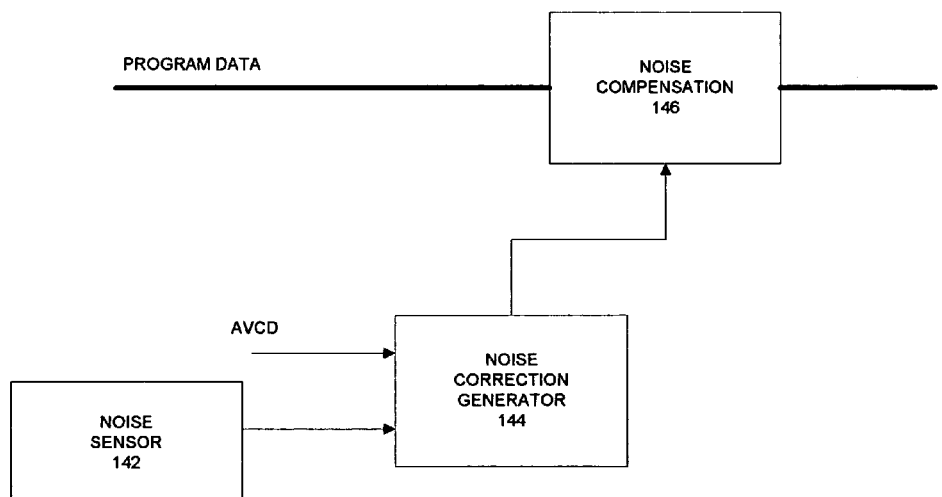
FIG. 6 shows a block diagram for a noise cancellation circuit in accordance with the present invention.

Referring to FIG. 6, a noise cancellation circuit 140 includes a noise sensor 142, a noise correction generator 144 and a mixer 146. Sensor 142 is used to sense ambient sounds and it may be for example a local microphone. The noise signals thus sensed are fed to the noise correction generator 144. The noise correction signal also receives from the AVCD information describing the spectral content of the program data on the corresponding channel, for example channel 1. The noise correction generator 144 analyzes the sensed noise signals and generates noise compensation signals. In this manner, the noise correction generator 144 does not have to perform its own analysis to differentiate between the desirable sound signals and the undesirable noise signals. These compensation signals are added to the program signals by mixer 146. Mixer 146 in turn mixes the channel 1 signals and the noise correction signals to thereby compensate for noise.

As previously mentioned, the AVCD may include metadata descriptive of the locations of the instruments, vocalists and/or recording microphones. This information is captured and displayed by a display 90 at the playback apparatus to give the customer a more accurate information about how the performance was recorded.

Although the invention has been described in terms of specific embodiments, it is intended that the patent cover equivalent substitutions for any of the elements of these embodiments, and that the protection afforded by this patent be determined by the legitimate scope of the following claims.

What is claimed is:

1. A playback system for reproducing audio data and reading acoustic control data from a recording medium, said acoustic control data including information related to the characteristics of the original acoustic environment associated with the production of said recording media, comprising:
    a demultiplexer for retrieving audio data and acoustic control data,
    said acoustic control data providing a predetermined number N of inputs to gain and phase circuits,
    delay and reverberation circuits,
    equalizer circuits, and
    gain/attenuation circuits,
    said gain/attenuation circuits connected to output to a second predetermined number M of summation channels,
    said audio data feeding serially through said gain and phase circuits,
    delay and reverberation circuits, and
    equalizer circuits;
    wherein the operation of said gain and phase circuits, said delay and reverberation circuits and said equalizer circuits is adjusted in accordance with said acoustic control data to replay said audio data by recreating said original acoustic environment.

2. The playback system for reproducing audio data and reading acoustic control data of claim 1 wherein said audio signals are replayed at a listener site, further comprising a listener input circuit connected to provide signals, said listener input signals providing information indicative of the local characteristics of the listener site.

3. The playback system for reproducing audio data and reading acoustic control data of claim 1 further comprising a player type register providing a signal indicative of parameters of the recording medium to said gain and phase circuits, delay and reverberation circuits, and equalizer circuits to provide information indicative of the characteristics of a player for the media, a player type register providing a signal indicative of parameters of the recording medium to said gain and phase circuits, delay and reverberation circuits, and equalizer circuits to provide information indicative of the characteristics of a player for said recording medium.

4. The playback system for reproducing audio data and reading acoustic control data of claim 2 further comprising a player type register providing a signal indicative of parameters of the recording medium to said gain and phase circuits, delay and reverberation circuits, and equalizer circuits to provide information indicative of the characteristics of a player for said recording medium.

5. The playback system for reproducing audio data and reading acoustic control data of claim 3 wherein said player type register is adapted to provide information to active noise cancellation apparatus.

6. The playback system for reproducing audio data and reading acoustic control data of claim 4 wherein said player type register is adapted to provide information to active noise cancellation apparatus.

7. The playback system for reproducing audio data and reading acoustic control data of claim 1, further comprising,
    a loop closing subsystem interfaced to said playback system comprising
    a programmable delay,
    a second generator for test signals,
    precision microphones to receive returned information from said test signals,
    connections to provide parameter corrections to parameters of said playback system.

8. The playback system for reproducing audio data and reading acoustic control data of claim 2, further comprising,
    a loop closing subsystem interfaced to said playback system comprising
    a programmable delay,
    a second generator for test signals,
    precision microphones to receive returned information from said test signals,
    connections to provide parameter corrections to parameters of said playback system.

9. The playback system for reproducing audio data and reading acoustic control data of claim 3, further comprising,
    a loop closing subsystem interfaced to said playback system comprising
    a programmable delay,
    a second generator for test signals,
    precision microphones to receive returned information from said test signals,
    connections to provide parameter corrections to parameters of said playback system.

10. The playback system for reproducing audio data and reading acoustic control data of claim 4, further comprising,
    a loop closing subsystem interfaced to said playback system comprising
    a programmable delay,
    a second generator for test signals,
    precision microphones to receive returned information from said test signals,
    connections to provide parameter corrections to parameters of said playback system.

11. The playback system for reproducing audio data and reading acoustic control data of claim 5, further comprising,
    a loop closing subsystem interfaced to said playback system comprising
    a programmable delay,
    a second generator for test signals,
    precision microphones to receive returned information from said test signals,
    connections to provide parameter corrections to parameters of said playback system.

12. The playback system for reproducing audio data and reading acoustic control data of claim 6, further comprising,
    a loop closing subsystem interfaced to said playback system comprising
    a programmable delay,
    a second generator for test signals,
    precision microphones to receive returned information from said test signals,
    connections to provide parameter corrections to parameters of said playback system.

13. The playback system for reproducing audio data and reading acoustic control data of claim 1, wherein said playback system further comprises a metadata display system.

14. The playback system for reproducing audio data and reading acoustic control data of claim 7, wherein said playback system further comprises a metadata display system.

\* \* \* \* \*